A. A. Randall,
Capping Screws and Nails,

No. 55,783.  Patented June 19, 1866.

Witnesses:  
M. A. Hine  
John H. Shumway

Inventor:  
Augustus A. Randall

2 Sheets—Sheet 2.

A. A. Randall,
Capping Screws and Nails.

Nº 55,783. Patented June 19, 1866.

Witnesses.
M. A. Hine
John H. Shumway

Inventor.
Augustus A. Randall
by atty
John E. Earle

United States Patent Office.

AUGUSTUS A. RANDALL, OF NEW HAVEN, CONNECTICUT, ASSIGNOR TO SARGENT & CO., OF SAME PLACE.

IMPROVEMENT IN MACHINERY FOR FINISHING COFFIN NAIL AND SCREW HEADS.

Specification forming part of Letters Patent No. 55,783, dated June 19, 1866.

*To all whom it may concern:*

Be it known that I, AUGUSTUS A. RANDALL, of New Haven, in the county of New Haven and State of Connecticut, have invented a new Improvement in Machines for Finishing Coffin Nail and Screw Heads; and I do hereby declare the following, when taken in connection with the accompanying drawings and the letters of reference marked thereon, to be a full, clear, and exact description of the same, and which said drawings constitute part of this specification, and represent, in—

Figure 1:
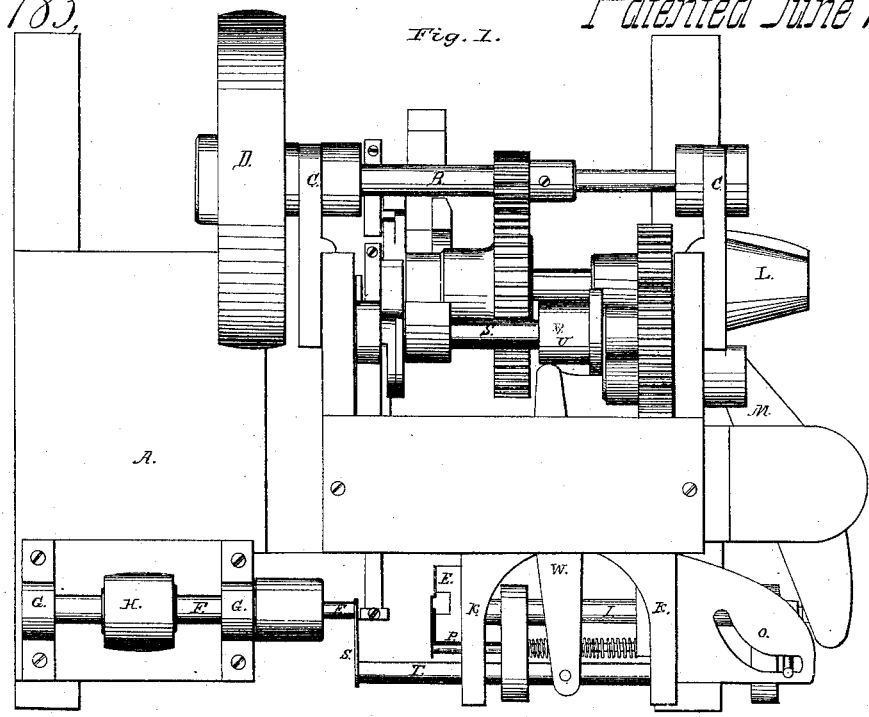
Figure 2:
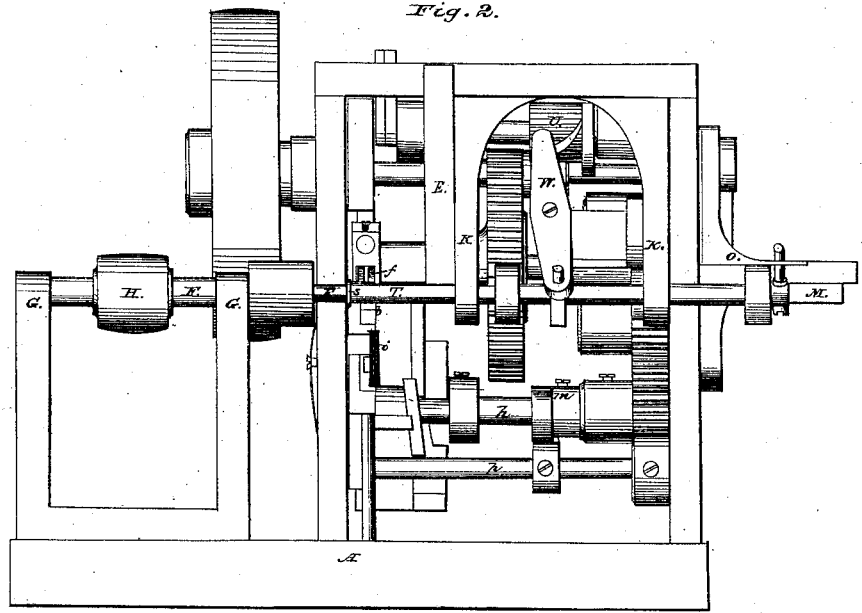
Figure 9:
Figure 10:

Figure 1, a top view; Fig. 2, a front view; Figs. 3, 4, 5, 6, 7, and 8, detached parts and sectional views to illustrate the operations of my invention; Fig. 9, a nail as it enters the machine, and in Fig. 10 the same nail finished.

My invention relates to an improvement in machinery for finishing metal heads of nails, screws, &c., such as are used for coffins, and for pad-screws, &c.; and it consists in a mechanism for receiving the nail or screw and automatically finishing and discharging the nail or screw from the machine.

To enable others skilled in the art to construct and use my improvement, I will proceed to describe the same as illustrated in the accompanying drawings.

A is the bed-plate, upon which the operative parts of the machine are placed; B, the driving-shaft, supported in bearings C and caused to revolve by the application of power to the pulley D.

E is a channel (see Figs. 3 and 4) formed to receive a number of screws or nails to be finished. They are placed therein one above another, the points projecting therefrom, as seen in Fig. 4.

F is a spindle supported in bearings G, and caused to revolve rapidly by the application of power to the pulley H. The said spindle F is arranged relatively to the channel E so that when a nail lies in the position at $a$, Fig. 3, the nail and spindle will be concentric.

Figure 3:
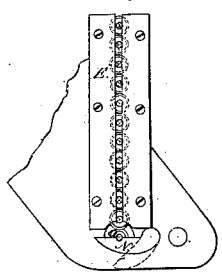
Figure 4:
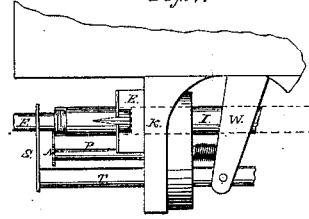

I is a spindle supported in bearings K, also concentric to the spindle F, (see Figs. 1, 3, and 4,) its inner end formed to receive the lower or first screw or nail when in the position as denoted in red, Fig. 4. Thus receiving the screw or nail, the said spindle I is advanced, by the action of the cam L, through the lever M, and, thus advanced, carries the first nail forward and inserts it into the spindle F, as seen in Fig. 4.

During this transfer of the nail from the channel to the spindle it is retained in the spindle I by a finger, N, (see Figs. 3 and 4,) which, as soon as the nail has been inserted into the spindle, is dropped to the position denoted in red, Fig. 3, by the action of the cam-plate O, (see Fig. 1,) the said finger being advanced with the spindle I. The cam-plate O acts to thus move the finger N by the shaft P, to which it is attached. This leaves the nail in the spindle F, rapidly revolving, to be turned and burnished, the spindle I and finger N retreating to their position to receive a second nail.

The first operation is to remove the surplus metal. This is done by a cutter, $b$. (See Fig. 5.) The said cutter is advanced to cut away the surplus metal, as from the position in Fig. 5 to that in Fig. 6, by the action of a cam, $c$, or a shaft, $d$. The said shaft $d$ is caused to revolve by gears from the driving-shaft, as seen in Figs. 1 and 2. Having been thus moved up and cut away the surplus metal, the cutter is, by the continued movement of the cam, returned to the position seen in Fig. 5.

Figure 7:
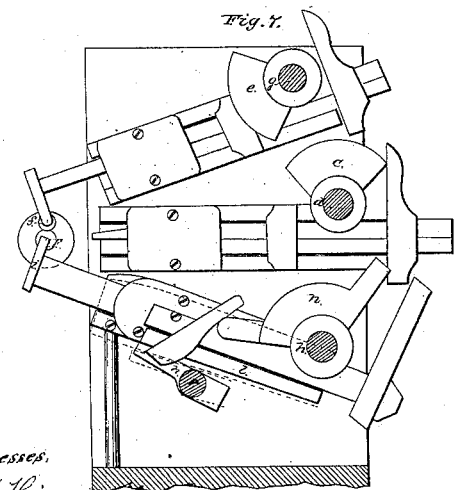
Figure 8:
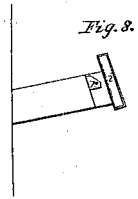

The next operation is milling or ornamenting. This is done by a mill, $f$, (see Fig. 5,) advanced to bear upon the nail-head, as seen in Fig. 7, by the cam $e$ on the shaft $g$, which said shaft $g$ is caused to revolve by gears from the shaft $d$, as seen in Figs. 1 and 2. The mill $f$ ornaments the head by rotating thereon in the usual manner for milling by hand, the reverse of the ornamentation being made on the mill $f$.

Figure 5:
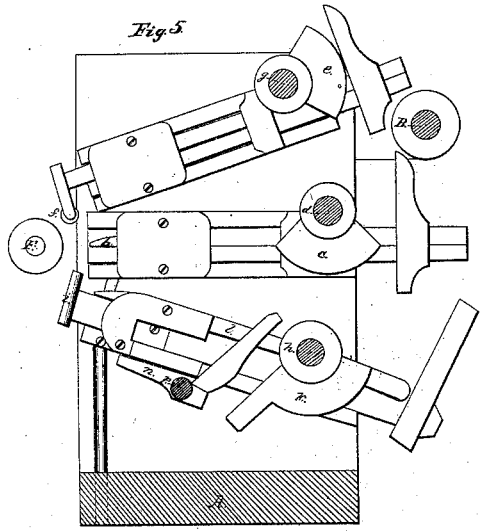
Figure 6:
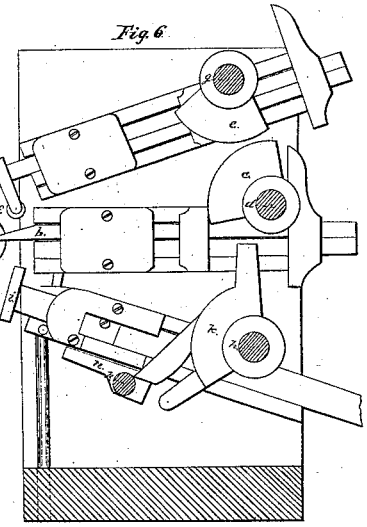

At the same time that this ornamentation is being made a burnisher, $i$, is advanced by the action of the cam $k$ on the shaft $h$, as from the position in Fig. 5 to that in Fig. 7, the shaft $h$ being revolved in like manner on the shafts $d$ and $g$. The said burnisher is hung in a carriage, $l$, to which a lateral movement is given, as from the position in red to that in black, Fig. 7, by means of a cam, $m$, on the shaft $h$, acting through another cam, $n$, on a shaft, $p$. (See Figs. 2 and 7.) The burnisher $i$ finishes the top or face of the nail, while a second burnisher, $r$, (see Fig. 8,) attached to the same support as the burnisher $i$, burnishes the edge of the head, both the said burnishers being formed according to the shape of the head to be finished.

This operation of milling and burnishing finishes the head, which being done the mill and burnisher return to the position seen in Fig. 5, the finished nail being still retained in the spindle $f$. To remove the finished nail therefrom preparatory to the insertion of a second nail, I arrange a slide, $s$, over the spindle $f$, as seen in Fig. 4, the said slide being attached to a shaft, T, which is moved, as from the position in black to that denoted in red, Fig. 4, by means of a cam, U, on the shaft $g$ through a lever, W. The slide $s$ draws the nail from the spindle, which, when freed therefrom, drops from the machine, complete and finished, into a receptacle prepared for the purpose. A second nail is now advanced in like manner as the first for the same operation, and thus continuing, each nail in the channel E is successively presented and finished, it only being required to keep a supply in the channel.

The adjustment and form of the cutter, mill, and burnisher will, of course, depend upon the style of the head to be produced. If no ornamentation upon the head is required, the mill should be detached; or if the head is to be ornamented entire, then the burnisher should be detached.

I therefore do not confine myself to the combination of a cutter, ornamenting-mill, and burnisher; but,

Having thus fully described my invention, what I claim as new and useful, and desire to secure by Letters Patent, is—

1. The combination of the spindles F and I, fingers N, and channel E, constructed and arranged to operate substantially in the manner and for the purpose specified.

2. In combination with the above, the cutter $b$, mill $f$, and a burnisher, substantially as and for the purpose specified.

AUG. A. RANDALL.

Witnesses:
JOHN E. EARLE,
M. A. HINE.